United States Patent Office 3,159,301
Patented Dec. 1, 1964

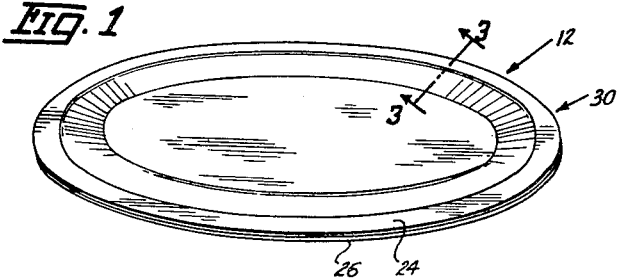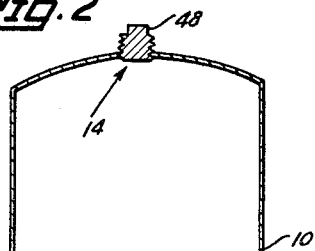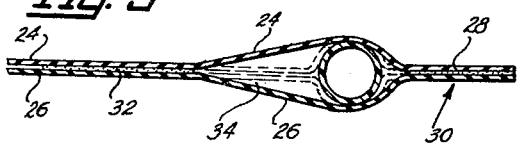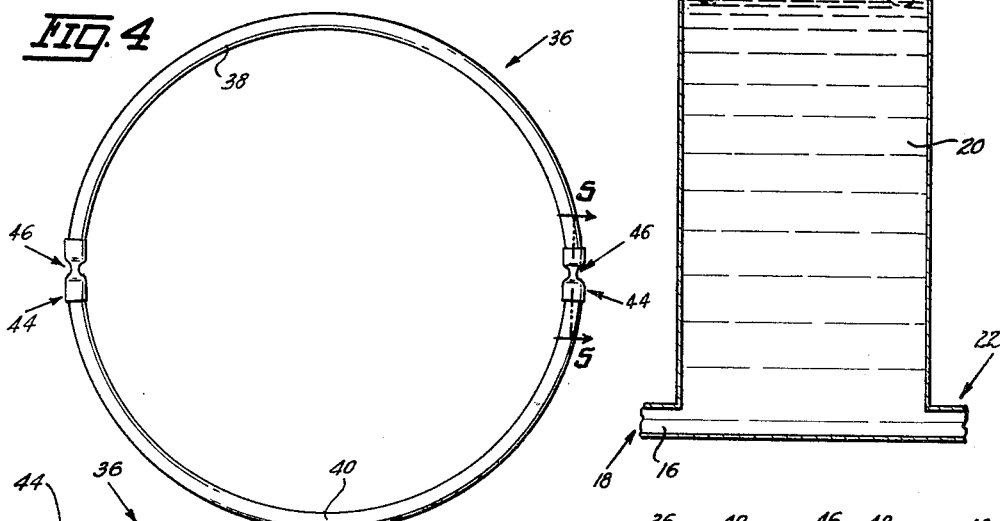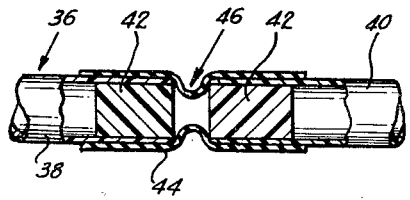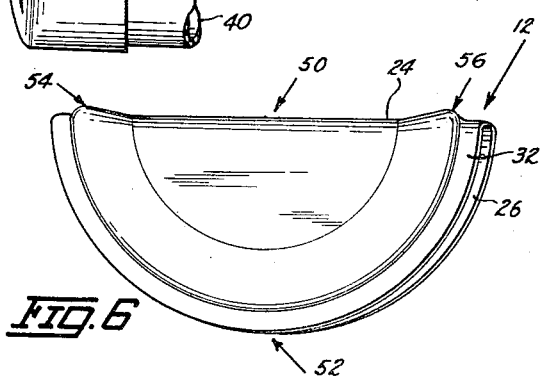
INVENTOR.
NOEL M. ANDERSON
BY Morton S. Adler
ATTORNEY.

3,159,301
FLOATING DIAPHRAGM FOR PRESSURE TANKS
Noel M. Anderson, P.O. Box 392, Storm Lake, Iowa
Filed Sept. 7, 1962, Ser. No. 222,033
10 Claims. (Cl. 220—26)

This invention relates to improvements in maintaining fluid under pressure in a fluid distributing system and more particularly to an improved floating diaphragm for use in the pressure tank of such system.

In pressure water systems, for example, using air induction means whereby air under pressure acts directly upon the water there is a requirement for air volume controls, special motors and small orifices which experience has shown has many disadvantages because of high initial costs and maintenance expenses. In such systems the small orifices inevitably corrode and clog and the free air is ultimately absorbed by the water resulting in water logging of the pressure tank.

Air bags of various types have also been employed in pressure systems for water and fluids other than water and one of the important objects contemplated by this invention is an improved floating diaphragm means designed for maintaining an adequate air pressure particularly in a pressure tank water system.

Another object contemplated herein is the provision of a floating diaphragm of the above class which is adapted to exert a uniform pressure over the cross sectional area of the tank on the water therein and which is designed for improved ease and efficiency in mounting the same within a fluid pressure tank.

A further important object herein includes the provision of a novel annular hollow buoyant float ring for mounting within the diaphragm, with such ring being formed in two complementary half circle sections which are both water-tight and fluid tight and which are hingedly secured together to form a complete ring by a highly flexible and resilient buoyant connection.

Another feature of this invention resides in the feature of several interdependent seal means for assuring the buoyancy of the float ring.

Still another object is to provide a diaphragm of the above class which is sufficiently resilient and flexible so as to be easily foldable for purposes of being passed through a relatively narrow opening for insertion into a pressure tank and which will assume and maintain its full predetermined shape when folding pressure is released due to the novel structure of the float ring above characterized.

A still further object is to provide this diaphragm with a highly flexible peripheral skirt or flange adapted to movably abut the inner wall of the pressure tank in a substantially sealing relationship.

To attain these objects and such further objects as may appear herein, or be hereinafter pointed out, reference is made to the accompanying drawings forming a part hereof, in which:

FIG. 1 is a perspective top view of this new diaphragm in extended or operable position, FIG. 2 is a longitudinal sectional view of a water pressure tank showing this diaphragm in float position intermediate the water and air in the tank, FIG. 3 is a cross sectional view taken on the line 3—3 of FIG. 1 with the broken lines indicating the shape of this diaphragm when it is in use and under external pressures, FIG. 4 is a plan view of the float ring used within this diaphragm, FIG. 5 is an enlarged cross sectional view taken on the line 5—5 of FIG. 4, FIG. 6 is a perspective view of this invention in folded position, and FIG. 7 is a fragmentary enlarged elevational view showing the folded position at the hinge point on the float ring.

Referring to the drawings an upright cylindrical pressure tank of a type commonly used in water distributing systems is designated by the numeral 10 and is illustrated to show the environment in which this new diaphragm 12 is used. Tank 10 is provided in its top with a restricted pluggable opening 14 and communicates at its bottom with a suitable flow line 16 adapted at one end 18, for example, to connect to a source of fluid or water supply which is pumped from such source by suitable pumping equipment (not shown) whereby the fluid 20 can accumulate in tank 10 and pass therefrom under pressure from diaphragm 12, as will later appear, through the other end 22 of line 16 to a point of use.

The diaphragm 12, which is preferably made from rubber or other comparable material, is generally of a disc shape and includes the complementary disc members 24 and 26 which are in juxtaposition with their perimeter portions sealed together by any suitable bonding agent 28 to thereby form the highly flexible and resilient sealing flange 30. Discs 24 and 26 are additionally bonded together as at 32 throughout a circular path which is spaced concentrically within the flange 30 to define the airtight and fluid tight chamber 34 as shown in FIG. 3 and in which I place my new and improved hingable float ring that I have designated generally by the numeral 36.

Float ring 36 comprises the two like flexible hollow tubular members 38 and 40 which are preferably made from polyethylene and are susceptible of being formed into and maintaining the arcuate shape shown in FIG. 4 whereby they are complementary in defining the circular ring 36. In each end of each member 38 and 40 I have placed a heat sealed plug 42 of plastic or the like which is air and fluid tight and serves to seal in the air within members 38 and 40 and assure the buoyancy of ring 36 in supporting member 12 as will be referred to later in more detail.

The connection of tube members 38 and 40 represents one of novel features of this invention and includes the use of two relative short lengths of highly resilient latex tubing 44 having a diameter less than the outside diameter of members 38 and 40 and preferably somewhat less than the diameter of the bore of such members. In connecting members 38 and 40 to form the ring 36 (FIG. 4), the opposed free end portions of tubing 44 are slip fitted over the respective opposed plug ends of members 38 and 40 as shown in FIG. 5 and it will be understood that this same arrangement is used at the diametrically opposite side of ring 36. In making this attachment of tube 44 it will be noted that the plugged ends of members 38 and 40 are not drawn into abutting contact but are rather secured in a relatively short spaced axial alignment for which a quarter or three-eighths inch spacing has proved adequate although this may, of course, be varied. This arrangement affords the short hinge point section 46 of tube 44 which retains its normal diameter and because of its high efficiency of resiliency, it normally urges and maintains the plugged ends 42 in axial alignment to hold diaphragm 12 in the flat disc like shape as illustrated in FIG. 1.

Diaphragm 12 as described is placed within tank 10 by passing it through the restricted opening 14, the diameter of which may vary with different tanks but usually in water pressure tanks which are commercially available will approximate one and one-quarter inch and is closable by a plug 48. To insert the diaphragm as indicated, it can be folded as much as 180° as shown in FIG. 6, the fold line resulting naturally on a line intersecting the diametrically opposite hinge points 46 in the tube members 44 and leaving the two equal halves of the diaphragm in a smooth unwrinkled condition and in juxtaposition. By then manually squeezing together this folded diaphragm by applying pressure at points 50 and 52 (FIG. 6) either of the ends 54 and 56 can be easily passed or threaded through opening 14 of tank 10. As soon as the entire diaphragm 12 is within the tank, it will immediately return to the position shown in FIG. 1 due to the resiliency of the hinge points 46 in tube members 44.

The position of diaphragm 12 within the tank 10 is shown in FIG. 2 where it is noted the flange or skirt 30 is in abutting contact with the inner walls of the tank as it moves with the rise and fall of water 20, and thus provides an effective sealing separation between the water 20 below and the air above it within the tank 10. Also, the flexibility of the flange 30 is such that it easily rides over any internal projections or nipples that may be present within the tank from its construction or otherwise and such projections, if present, do not in any way interfere with or effect the use of diaphragm as described.

Maintaining the buoyancy of the diaphragm 12 is an important factor for if buoyancy is lost, the diaphragm or float in use with pressure tanks will quickly sink and disrupt the proper functioning of the tank. In this respect, tubular members and floats of sponge material and the like which have heretofore been used have frequently become water filled or water logged so that they cease to function as intended. In this invention, to assure the buoyancy provided by members 38 and 40 it will be noted that I have provided several air and fluid tight seal elements of which any one would be satisfactory by itself and which in combination provide a more than ample safety factor for any unforeseen situation. These factors include the heat sealed plugs 42, the chamber 34 and the hinge tube 44 which all adequately serve to keep the interior of members 38 and 40 water free and to prevent the escape of air therefrom. In addition, the hinge action afforded by member 44 as described assures that diaphragm 12 will always be in its most effective operable position (FIG. 1) since members 38 and 40 while bendable and capable of holding their arcuate shape, are not otherwise readily deformable or collapsible and thus normally maintain their extended position (FIG. 4) under the urging of the tubular members 44.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a floating diaphragm for a fluid distribution pressure tank, the combination of:
 a pair of flat flexible resilient disc shaped members in juxtaposition,
 said disc members being bonded together throughout a concentric first path which is spaced inwardly from the perimeters of said disc members,
 said disc members being bonded together throughout a concentric second path contiguous with the perimeters of said disc members and extending inwardly therefrom but spaced outwardly from said first bonded path to form an air-tight and fluid-tight air chamber therebetween,
 a float ring within said chamber comprising two like flexible hollow tubular members,
 each tubular member being semicircular in shape and disposed relative to the other tubular member so as to be complementary in forming a complete ring,
 respective ends of one tubular member in their normal position being spaced in relatively close axial alignment to respective ends of the other tubular member,
 means in each end of each tubular member forming an air and fluid tight seal,
 a highly resilient tube of lesser diameter than said tubular members and being slip fitted at respective ends over the respective opposed ends of said tubular members,
 said tube maintaining its normal diameter in the space intermediate the opposed ends of said tubular member and defining thereat a hinge point whereby said diaphragm can be folded for purposes of being passed through a restricted opening in a tank, and
 said tube normally maintaining a planar position to hold said tubular members in a full circle position.

2. In a floating diaphragm for a fluid distribution pressure tank, the combination of:
 a pair of flat flexible resilient disc shaped members in juxtaposition,
 means securing said disc members together so as to form an annular chamber therebetween,
 a float ring within said chamber comprising two like flexible hollow tubular members,
 each tubular member being semicircular in shape and disposed relative to the other tubular members so as to be complementary in forming a complete ring,
 respective ends of one tubular member being spaced in relatively close axial alignment to respective ends of the other tubular member,
 respective buoyant hinge means joining the respective opposed ends of said tubular members, said hinge means comprising,
 a highly resilient tube of lesser diameter than said tubular members slip fitted at respective ends over the respective opposed ends of said tubular members,
 said tube maintaining its normal diameter in the space intermediate the opposed ends of said tubular member and defining thereat a hinge point whereby said diaphragm can be folded for purposes of being passed through a restricted opening in a tank, and
 said tube normally maintaining a planar position to hold said tubular members in a full circle position.

3. A device as defined in claim 2 including air and fluid tight seal means in each end of each tubular member.

4. A device as defined in claim 2 wherein said tube member serves as an air and fluid tight seal for the respective ends of said tubular members to which they are attached.

5. A device as defined in claim 2 wherein said chamber is air and fluid tight.

6. A floating diaphragm for a fluid distribution pressure tank comprising:
 a flat flexible hollow diaphragm,
 means defining an endless annular air and fluid tight chamber within said diaphragm,
 a float ring within said chamber comprising two like flexible hollow tubular members,
 each tubular member being semicircular in shape and disposed relative to the other tubular member so as to be complementary in forming a complete ring,
 respective ends of one tubular member being spaced in relatively close axial alignment to respective ends of other tubular member, and
 respective resilient hinge means foldable up to one hundred and eighty degrees and connected directly to respective opposed ends of said tubular members so as to serve as a closure for said ends and also as means for normally maintaining said tubular members in a flat planar position.

7. A floating diaphram for a fluid distribution pressure tank comprising:
 a flat flexible hollow diaphragm,
 a float ring within said diaphragm comprising two like flexible hollow tubular members, each tubular member being semicircular in shape and disposed relative to other tubular member so as to be complementary in forming a complete ring, respective ends of one tubular member being spaced in relatively close axial alignment to respective ends of the other tubular member, and respective resilient hinge means foldable up to one hundred and eighty degrees and connected directly to respective opposed ends of said tubular members so as to serve as a closure for said ends and also as means for normally maintaining said tubular members in a flat planar position.

8. In a flat flexible hollow diaphragm, a means for normally and automatically maintaining said diaphragm in a flat extended configuration, said means comprising:

a float ring within said diaphragm comprising two like flexible hollow tubular members, each tubular member being semicircular in shape and disposed relative to the other tubular member so as to be complementary in forming a complete ring, respective ends of one tubular member being spaced in relatively close axial alignment to respective ends of the other tubular member, and respective resilient hinge means foldable up to one hundred and eighty degrees and connected directly to respective opposed ends of said tubular members so as to serve as a closure for said ends and also as means for normally maintaining said tubular members in a flat planar position.

9. In a flat flexible hollow diaphragm, a means for normally and automatically maintaining said diaphragm in a flat extended configuration, said means comprising:

a float ring within said diaphragm comprising two like flexible hollow tubular members, each tubular member being semicircular in shape and disposed relative to the other tubular member so as to be complementary in forming a complete ring, respective ends of one tubular member being spaced in relatively close axial alignment to respective ends of the other tubular member, a highly resilient tube of lesser diameter than said tubular members slip fitted at respective ends over the respective opposed ends of said tubular members, said tube maintaining its normal diameter in the space intermediate the opposed ends of said tubular member and defining thereat a hinge point whereby said diaphragm can be folded for purposes of being passed through a restricted opening in a tank, and said tube normally maintaining a planar position to hold said tubular members in a full circle position.

10. A device as defined in claim 9 wherein said tube serves as an air and fluid tight closure for said tubular members.

References Cited in the file of this patent

UNITED STATES PATENTS

| 2,715,231 | Marston | Aug. 16, 1955 |
| 2,888,717 | Domitrovic | June 2, 1959 |
| 3,049,261 | Wade et al. | Aug. 14, 1962 |

FOREIGN PATENTS

| 289,243 | Switzerland | Feb. 28, 1952 |
| 880,847 | Great Britain | Oct. 25, 1961 |
| 890,422 | Great Britain | Feb. 28, 1962 |

THERON E. CONDON, *Primary Examiner.*

EARLE J. DRUMMOND, *Examiner.*